United States Patent [19]

Tussey

[11] Patent Number: 4,916,471

[45] Date of Patent: Apr. 10, 1990

[54] ADJUSTABLE, UNDERWATER CAMERA EQUIPMENT ARM ASSEMBLY

[76] Inventor: Chester E. Tussey, 5724 Dolphin Pl., La Jolla, Calif. 92037

[21] Appl. No.: 392,588

[22] Filed: Aug. 11, 1989

[51] Int. Cl.⁴ .............................................. G03B 17/08
[52] U.S. Cl. ...................................... 354/64; 354/126
[58] Field of Search ...................... 354/64, 126, 149.1, 354/354

[56] References Cited

U.S. PATENT DOCUMENTS

| | | | |
|---|---|---|---|
| 2,996,967 | 8/1961 | Edgerton | 354/64 |
| 3,738,248 | 6/1973 | Fish et al. | 354/64 |
| 4,051,493 | 9/1977 | Nakagawa et al. | 354/126 |
| 4,425,531 | 1/1984 | Holmes | 354/126 |

Primary Examiner—L. T. Hix
Assistant Examiner—Brian W. Brown
Attorney, Agent, or Firm—William W. Haefliger

[57] ABSTRACT

An adjustable, articulated, underwater strobe arm assembly, comprising: at least three links arranged in end-to-end relation, for adjustably interconnecting items of photographic equipment; at least one link including longitudinally endwise spaced pairs of sockets to receive and adjustably tighten on balls carried by other links; the one link includes two elongated link sections, each of which carries two of the sockets; hinge means associated with and interconnecting the sections, to allow relative rotating of the sections about a first axis extending longitudinally; and clamping means carried by the one link to effect relative rotation of the sections about the longitudinal axis, in response to tightening of the clamping means, whereby the sockets tighten onto the balls to prevent relative rotation.

10 Claims, 4 Drawing Sheets

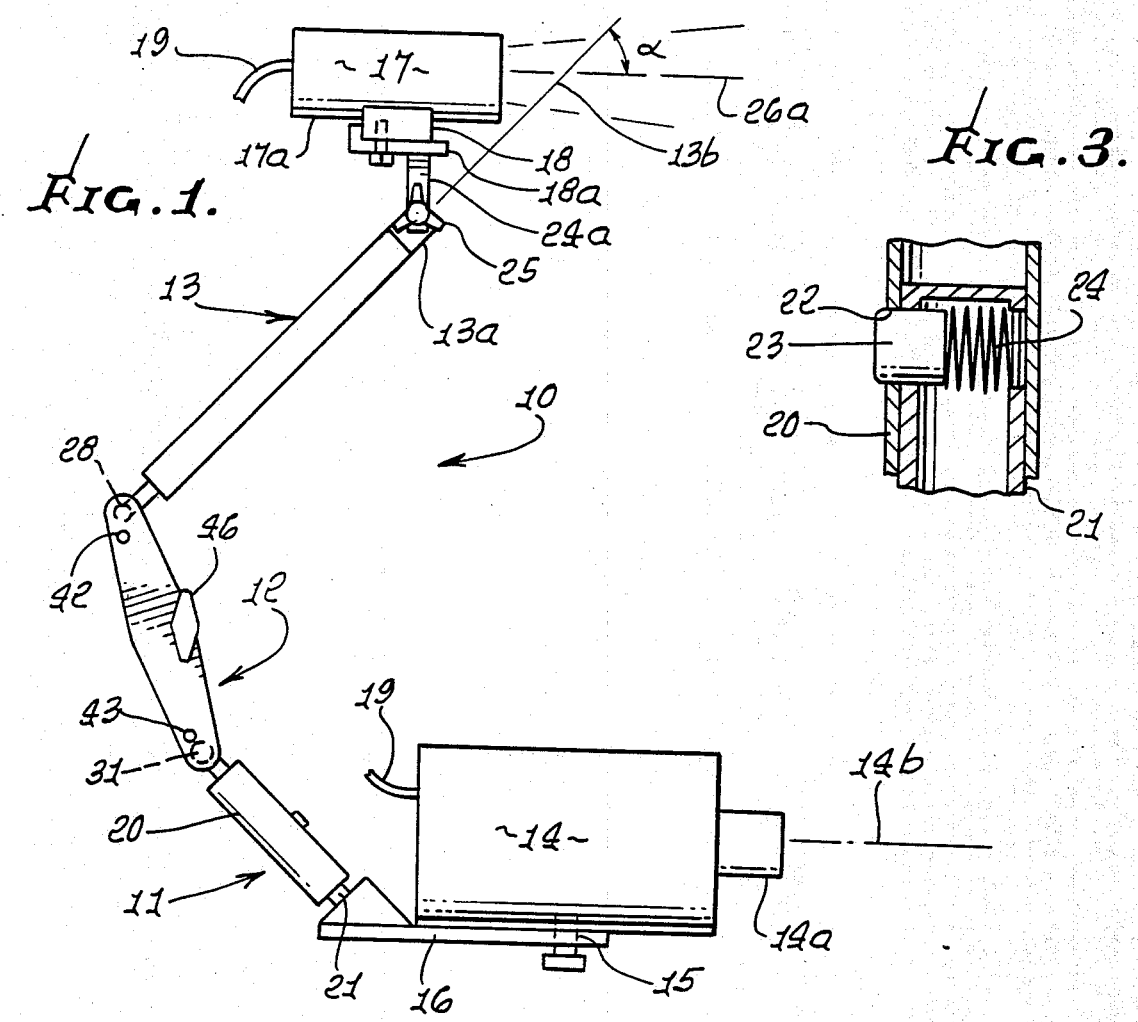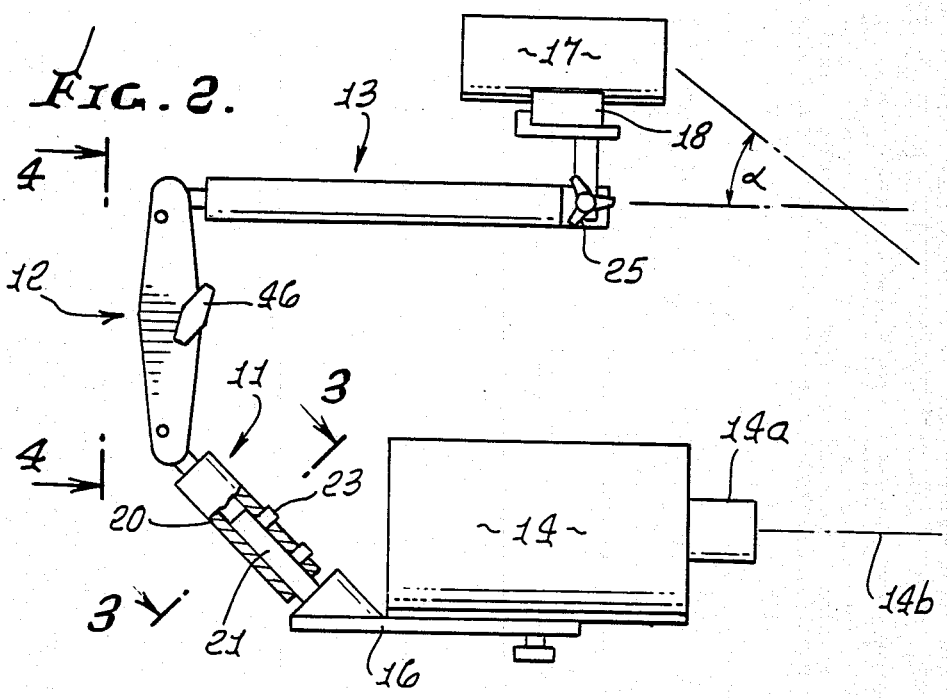

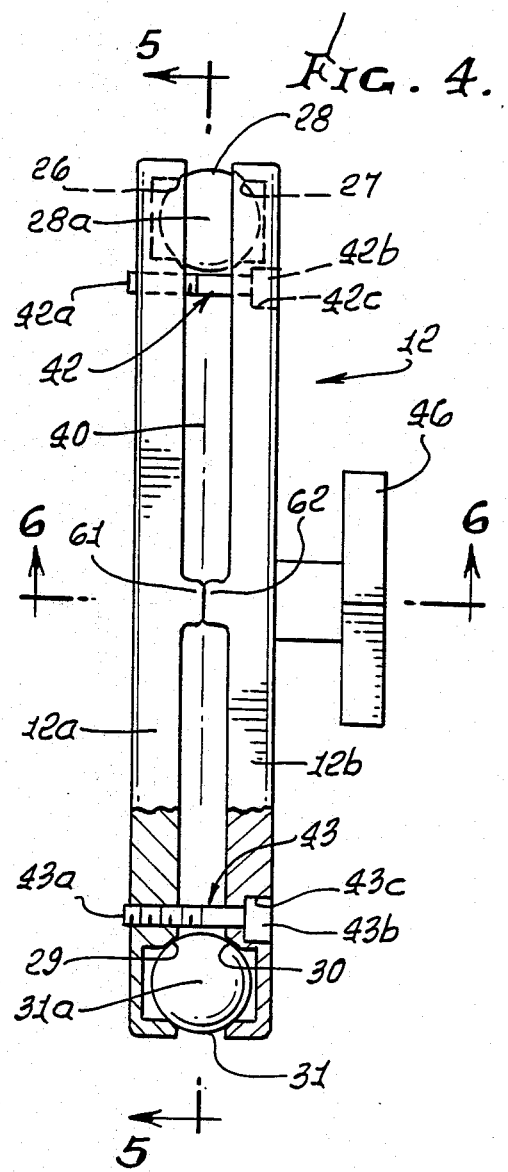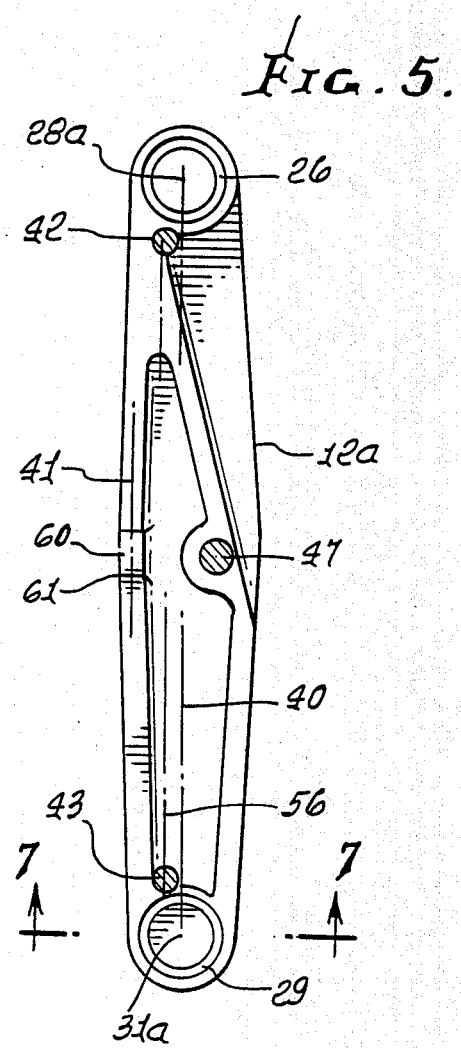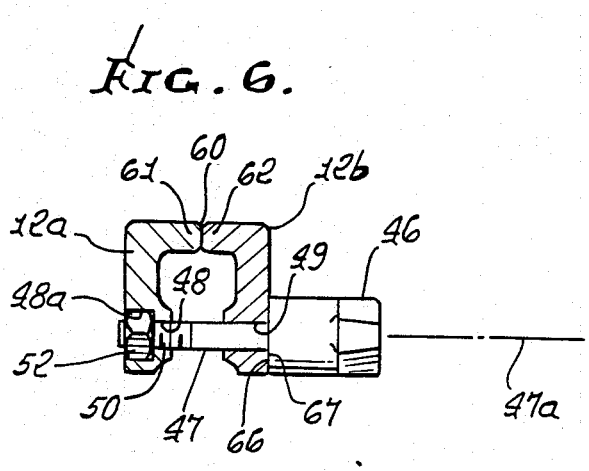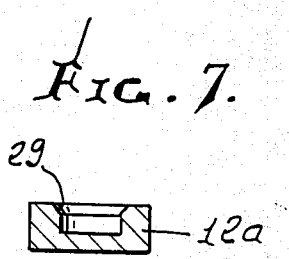

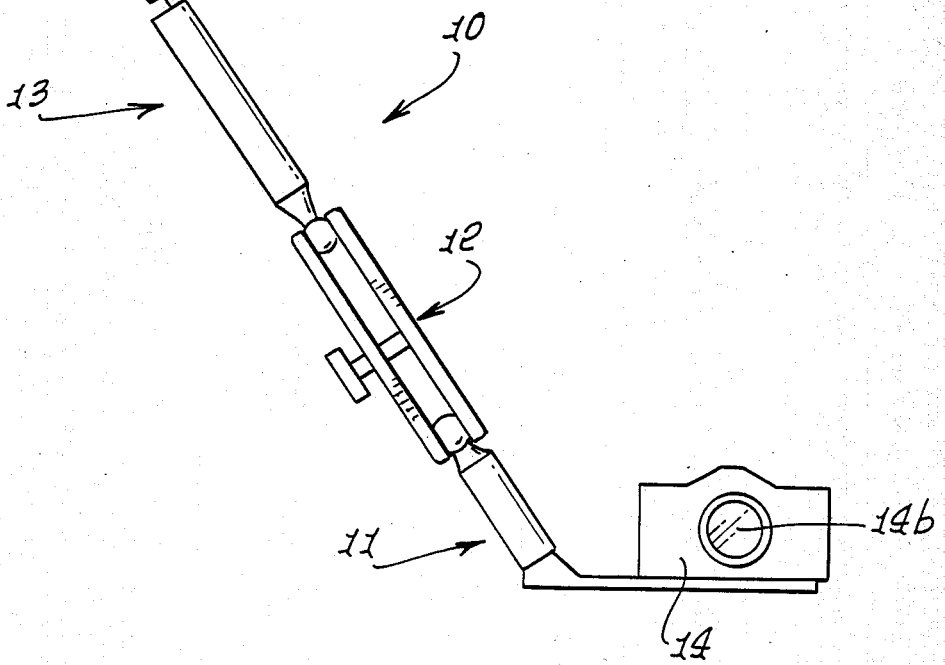

ADJUSTABLE, UNDERWATER CAMERA EQUIPMENT ARM ASSEMBLY

BACKGROUND OF THE INVENTION

This invention relates generally to underwater photography, and more particularly, to improvements in articulation and adjustability of underwater camera arm assemblies.

Underwater photography has developed into a burgeoning sport for the amateur and is of ever-increasing importance to offshore oil drilling and well repair. Equipment used for still photography includes a camera which can be either a standard land camera enclosed in a watertight housing with waterproof glands and levers for its operation or a self-contained underwater camera. As used herein, the term "camera" will apply to either type.

As the photographer descends into the ocean depths, most colors quickly disappear. In ocean water as shallow as 50 feet, all objects appear as a monochrome blue-grey and light levels drop drastically. For this reason, an artificial light is a practical necessity. This is accomplished by use of an electronic flash unit built specifically for use underwater with a cord connected to the camera to trigger the flash as the shutter is released. In underwater parlance these flash units are known as "strobes".

The camera underwater is typically handheld and levers are manipulated with both hands. A diver seldom stands on the sea bottom. More likely he adjusts his weight so that he floats somewhere above the bottom while photographing.

Since the strobe must be aimed directionally to properly light the subject, another critical piece of necessary equipment is the "strobe-arm", the linkage of members used to position the flash unit with relationship to the camera. Motion picture cameras and video cameras are also used underwater in watertight housings. Lighting is also required for proper exposure and color correction. Again, an important piece of equipment is the leverage system to maintain a light source at proper distance and relationship to the camera.

In contrast to above-water photography, strobe units cannot achieve acceptable results when mounted in close proximity to the picture taking lens. When this is attempted, it results in intensely illuminating all the miscellaneous dirt and organic particles suspended in the water column directly ahead of the lens, creating the illusion of brightly lighted snow between the camera and the subject. The picture is then rendered useless. This effect is called "scatter".

It is known to use a system of rods or levers to suspend a strobe at a point as far away from the camera as thirty inches or as close as two inches. This distance depends upon the nature of the subject, and whether the photographer intends to take a picture of a large animal or scene, or a very small subject. In the latter instance, modern underwater cameras are capable of one to one (1 to 1) performance, meaning capable of one to one (1 to 1) performance, meaning that the subject can be reproduced at life size on the film.

Since there are innumerable possibilities facing an underwater photographer when he enters the sea, the optimum equipment will allow him to choose to place his strobe in any number of positions with regard to distance from the subject and from the lens, and at any angle with regard to the above. At the same time, his two major items of equipment, his strobe and camera, must have an ability to be locked into a position so that it requires an overt act on the photographer's part to alter this relationship. Ocean wave action and severe underwater currents tend at times to move the strobe into an unintended position as the diver moves from place to place, and because of lack of readiness, cause the photographer to miss an important picture or fail to light the subject properly.

Since the first attempt to light an underwater photograph, made late in the nineteenth century by using a watertight wooden box with gun powder supplying the illumination, man has grappled with the problem of how to support the light in relationship to the camera. Many inventions and adaptions have been supplied, each with some merit, but each also failing to do the complete job. One of the earliest modern day support arms was designed by Rolliflex Camera Company and consisted of a tubular rod attachment to the housed camera terminating in a ball. Another similar tube was attached to the strobe or flashbulb holder, with its lower end terminating in a similar ball. The two balls were clamped between two flat pieces joined in the center by a clamping screw. Each of the flat pieces had depressions which captured the balls and exerted pressure upon the balls as the clamping screw was tightened. These pieces may be made of relatively thick metal and designed to be as short as possible to avoid the effects of the bending moment of the clamping screw. Typically, the distance between the centers of the two balls is less than 1.5 inches.

Since it can be rotated and/or pivoted around the lower lever ball, this system provided a degree of mobility for the upper end of the lever system. The major drawback of this design is its lack of rigidity. It is impossible to attain sufficient pressure on the balls to keep them from moving even under a small load. This is due to the divided nature of the direct force of the clamping screw, one half of the total force being supplied to each ball. A second disadvantage is the fact that it requires more pressure than can be generated with a single hand screw to prevent movement of the levered arms. Another limitation is found in the circumstance that the strobe unit can only be deployed in an arc swung around the upper end of the lower or fixed ball. The support provided is adequate in quiet water when the strobe unit is nearly at equilibrium with its weight supported by water, but does not do a satisfactory job when used in strong currents and ocean turbulence. Above the surface of the water the strobe unit is much too heavy for the double-ball leverage system. Left unrestrained, the strobe will crash into the underwater camera that is being supported by the diver's hands with possible damage to one or both units. There is also a possibility of diver injury due to a scissors-like action of the levers.

A further disadvantage is the prior lack of incremental adjustment. Since the flat pieces clamping the two balls ar very rigid and do not flex when the clamping screw is loosened even slightly, the frictional pressure on the balls is reduced dramatically and the system collapses. Thus, the diver-photographer is often seen underwater on his knees using both hands to grapple with the task of holding the strobe and camera in correct relationship while attempting to tighten the clamping screw.

There are a number of other devices that use sliding or telescoping tubes to accomplish the desired result. Typically, if they are strong enough, they are awkward to use and very bulky. If they are lighter and more compact, they are also flimsy and offer limited support.

A major disadvantage to telescoping devices is that when used close to the camera, the reversed ends of the telescoped tubes protrude to the rear and interfere extensively with positioning the camera and the body and head of the photographer.

None of the present devices used for support to my knowledge permit the positioning of the strobe in extreme proximity to the camera lens, in locations anywhere in the 360 degrees available when looking directly into the camera lens. This is important since light attenuates rapidly underwater and only by bringing the strobe to a position as close as one to three inches from the subject can the photograph be expose at a numerically high f-stop, maintaining good depth of field and high color saturation of the film. While underwater close-up photographers attempt to do this, many times there are protuberances that interfere with equipment placement when using current strobe arms. As a result, many photographers resort to removing the strobe and arm and hand-hold the strobe in the proper position. This results in an imprecise alignment and the result is often unusable.

SUMMARY OF THE INVENTION

It is a major object of the invention to provide improved, articulated, support arm structure for an underwater strobe unit, and which overcomes the above-described disadvantages and problems, through providing advantages in construction simplicity and effectiveness, as well as in modes of operation and results. Basically, the improved strobe arm assembly comprises:

(a) at least three links arranged in end-to-end relation, for adjustably interconnecting items of photographic equipment, (b) at least one link including longitudinally endwise spaced pairs of sockets to receive and adjustably tighten on balls carried by other links, (c) the one link including two elongated link sections, each of which carries two of the sockets, (d) hinge means associated with and interconnecting the sections, to allow relative rotating of the sections about a first axis extending longitudinally, (e) and clamping means carried by the one link to effect relative rotation of the sections about the longitudinal axis, in response to tightening of the clamping means, whereby the sockets tighten onto the balls to prevent relative rotation.

As will be seen, the link sections are elongated to an extent that they effectively provide an intermediate link of substantial proportions. The lower leg or link of the assembly is attached to the camera structure and terminates in a ball at its upper end. The elongated clamping sections of the intermediate link attach to this ball and extend to also clamp the ball on the upper leg or link. The extreme end of the upper link is attached to the strobe unit as by means of an adjustable pivot joint to be described.

The result provided by this three-link assembly is a highly articulated support for the strobe unit. Due to the provision of the described elongated clamping plates or sections of the intermediate link, and a unique method of multiplying the frictional forces on the balls, the arm is capable of a wide range of friction adjustment (from minimal to rigid) to resist articulation. By adjusting clamping means, the photographer can, at will, extend the strobe unit forward, backward, overhead, underneath, or to either side of the camera.

Normally while underwater, the entire assembly must be supported in the diver's hands at all times, since surging currents obviate the possibility of setting the unit on rocks or coral for adjustments. Therefore, the ability to reduce or increase tension on the ball clamp by small increments, allowing for one handed realignment of positions, as enabled by the invention, is extremely important. The clamping arrangement typically requires two full turns from loose position to locked position permitting a full range of adjustment. Also, provision for much greater pressure on the ball joints is achieved by the present invention, by employing a unique torsion lever system which is integral to the extended clamping plates or sections.

These and other objects and advantages of the invention, as well as the details of an illustrative embodiment, will be more fully understood from the following specification and drawings, in which:

DRAWING DESCRIPTION

FIG. 1 is an elevation showing one embodiment of the apparatus of the invention, the support arm in one extended position;

FIG. 2 is a view like FIG. 1, showing the support arm in adjusted, partly collapsed position;

FIG. 3 is a section taken on lines 3—3 of FIG. 2;

FIG. 4 is an enlarged view taken on lines 4—4 of FIG. 2;

FIG. 5 is a section on lines 5—5 of FIG. 4;

FIG. 6 is a section on lines 6—6 of FIG. 4;

FIG. 7 is a section on lines 7—7 of FIG. 5;

FIG. 8 is an enlarged section showing an adjustment; and

FIGS. 9–13 are elevations showing additional possible positions of components enabled by the invention.

DETAILED DESCRIPTION

Figure 11:
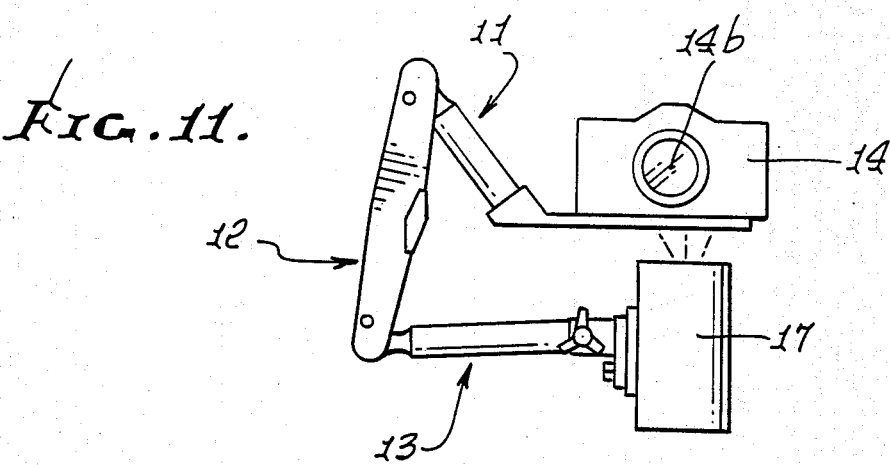

In the drawings, the strobe arm assembly 10 includes at least three links, as at 11–13, arranged in end-to-end relation, for adjustably interconnecting items of photographic equipment. The latter typically includes an underwater camera 14 mounted at 15 on a base plate 16, and an electronic flash unit 17 mounted at 18 on a base plate 18a. A cord 19 interconnects the camera and unit 17 to trigger the flash as the camera shutter is released. Batteries may be carried within the case 17a of unit 17. See also camera lens housing 14a, and lens axis 14b.

The lower link 11 may include a tubular sleeve 20 telescopically received on a shaft 21 projecting upwardly and at an angle from plate 16. The sleeve 20 has an opening 22 in its side wall to receive a locating pin 23 carried by the shaft, and spring-urged outwardly, at 24. Therefore, when the pin is pushed inwardly, the sleeve may be freed from the shaft 21 to disconnect the arm assembly 10 from the camera.

Upper link 13 has its upper end 13a pivotally attached to a member 24a integral with base plate 18a. When clamp handle 25 is tightened, the end 13a and member 24a are frictionally held together to establish an angle α between the axis 13b of link 13, and the axis 26a, which extends in the direction of light passage from the unit 17. See pivoted position of axis 26a in FIG. 2.

The intermediate link 12 is adjustably pivotally attached to both of links 11 and 13, in such manner that by means of one manually controlled clamping action, the pivoted attachments to both links 11 and 13 are tightened or loosened to desired extent. To this end, link 12 includes longitudinally endwise spaced pairs of sockets to receive and adjustably tighten on balls carried by links 11 and 13. See for example the pair of sockets 26 and 27 tightenable on ball 28 integral with and projecting from the lower end of link 13, and the pair of sockets 29 and 30 tightenable on ball 31 integral with and projecting from the upper end of link 11. Sockets 26 and 27 are longitudinally spaced from sockets 29 and 30.

Further, the link 12 includes two parallel, elongated sections 12a and 12b, each of which carries two of the sockets. As shown, section 12a carries annular sockets 26 and 29; and section 12b carries annular sockets 27 and 30. A longitudinally axis 40 is thus defined to extend between the centers 28a and 31a of the two balls 28 and 31, which act as pivotal connections from the link 12 to the links 13 and 11, respectively.

Also provided is hinge means associated with and interconnecting the sections 12a and 12b, to allow relative rotating of the sections about an axis 41, offset from axis 40.

Axis 41 typically extends parallel to axis 40, and may be defined by the interengagement at 60 of two abutments 61 and 62 on the sections 12a and 12b and which define a fulcrum. Two connectors 42 and 43 are longitudinally spaced and interconnect the two sections 12a and 12b, those connectors being sufficiently loose to allow "hinging" of the sections about axis 41. As seen in FIG. 4, the connectors have shanks 42a and 43a thread connected to section 12a; and they have heads 42b and 43b seated in counterbores 42c and 43c in section 12b.

Also provided is clamping means carried by link 12 to effect relative rotation of the sections 12a and 12b about the hinge axis 41, in response to tightening of the clamping means, whereby the sockets are adjustably tightenable onto both the balls in correspondence to the extent of adjustable tightening of the clamping means. As a result, by one simple tightening motion or action, the three links 11-13 may be locked into selected relative angularity, as for example as seen in FIG. 1 and FIG. 2, and an infinite number of other relative positions.

As shown in FIG. 6, the clamping means includes a rotary clamping handle 46 from which a threaded stem 47 projects into bores 48 and 49 in the sections 12a and 12b. Step shoulder 66 engages surface 67 of section 12b. A counterbore 48a receives a nut 52 that is threaded to threadably engage the threading 50 on the stem 47. The transverse axis 47a of stem 47 is located to the right of longitudinal axis 40 in FIG. 5 wherein the hinge axis 41 is to the left of axis 40; also, hinge axis 41 is to the left of the longitudinal axis 56 extending between the two connectors 42 and 43, that axis 56 also lying to the left of axis 40. Clamp 46 lies intermediate the opposite ends of the link 12.

The fulcrum points at 60 are in contact with each other when the assembly is at rest. As clamping screw 47 is tightened, it induces a torsion movement, pivoted on the fulcrum. The torque so generated is transmitted by sections 12a and 12b to their opposite ends, and the ball sockets are rotated toward the balls, the pivot screws also acting as hinges. Because the pivot screw holes are quite close to the centerline 40, a mechanical advantage of the range of five to one (5 to 1) up to ten to one (10 to 1) is generated, putting great pressure on the hardened balls and increasing the frictional force proportionately.

The fulcrum points at 60 act not only as a hinge point in developing the torque in conjunction with the clamping means, but also act as a support to prevent the clamping plates from distorting from the inward pressure developed.

As referred to, the extreme upper end of the arm assembly is attached the strobe unit. Such strobe units are made by a number of manufacturers and each has its own individual attachment system. To accommodate these strobe units, adapters to fit each design are provided. The upper part of the adapter fits the individual strobe unit, but the lower end that attaches to the arm assembly has a unique hinge joint which fulfills the requirement for total articulation, such as found in the human arm starting with the shoulder joint and including the upper arm, lower arm, and wrist joint.

As seen in FIG. 8, the hinge joint for the strobe unit adapters employs a floating torque disc 70, which is similar to two truncated cones joined at the base and drilled through the center. The cone 70 is fabricated from non-metallic material with a low coefficient of friction, and bears on two cone-shaped cavities 71 and 72 held in proximity by tightening of screw 73 by means of handle 25. The hand screw 25a emerges on the opposite side of the assembly by threading through a specially modified castellated locking nut 74 which increases the thread friction considerably over the normal. Included in the threaded assembly is a cupped spring washer 75 which maintains constant pressure on the assembly.

It is important that the strobe unit be held at a specific angle and yet be easily altered by the photographer. The invention permits incremental friction to be applied with one-handed operation. Once set, the strobe unit angle may be changed by merely pushing the unit back and forth to the desired position. The unique locking nut arrangement allows repeated oscillations without loosening the hand screw or changing the torque setting.

The above-described mechanism is also used as the single joint in a simple arm used to hold underwater video lights. Video photography does not suffer from light scatter directly in front of the lens as does film photography, since video tubes cannot respond to the tiny scatter particles. Therefore, the lamps used can be located closer to the lens axis. There also is no need for cross lighting or rear lighting. Therefore, the single direction video arms provide the proper support for the lamps. They are hinged in such a manner that the light is always directed along the lens axis.

An added feature of the strobe arm is the fold-down position. Mention has been made of difficulties due to total collapse of the existing arm systems when the assembled equipment is removed from the water. By means of the present invention, insurance against collapse is achieved in the fold-down position, even though the clamping screw is inadvertently left loose. The clamping plates are pivoted around the stationary ball atop the lower tubular arm to the rear (towards the photographer) until they are in a horizontal position. Next the upper arm assembly is rotated forward until the upper arm nestles between the clamping plates in the cavity prepared for that purpose. In this position the assembly becomes much more compact and handling ease is greatly improved. Even with extremely heavy strobes weighing up to ten pounds, there is no movement when the assembly is removed from the water. This remains true even if the clamping screw is not fully tightened. An additional advantage to the fold-down position is the more streamlined profile offered by this configuration. The diver must often swim considerable distances underwater to position himself for a photograph, and anything that reduces drag is of considerable advantage.

Figure 12:
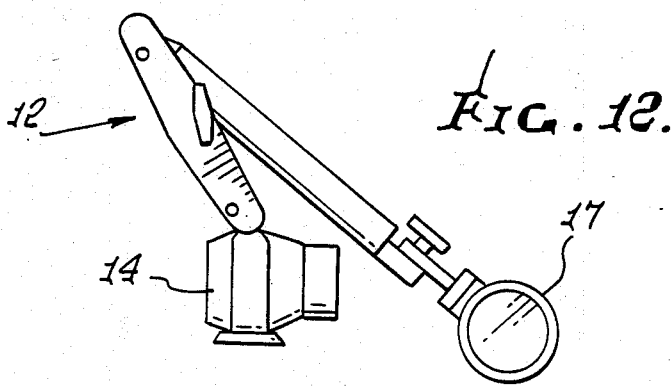
Figure 13:
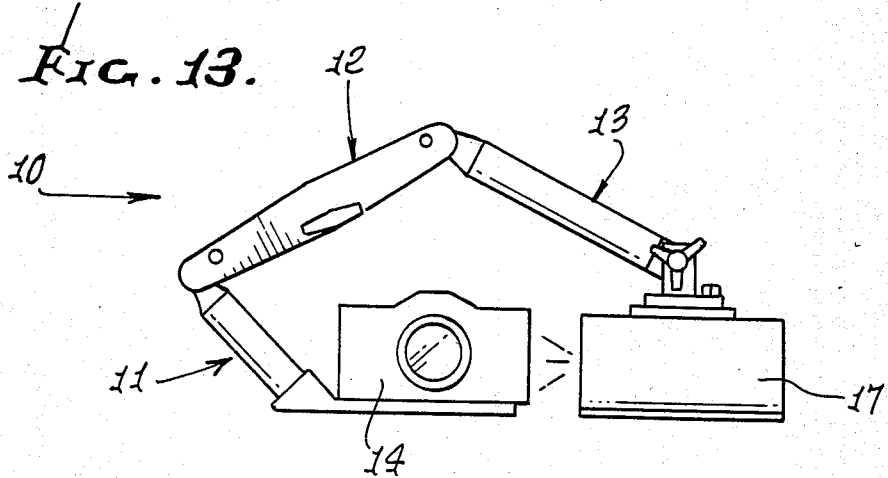

FIGS. 9-13 show different strobe and camera relative positions enabled by the invention. In FIG. 10, the light from the strobe unit projects out of the plane of FIG. 10 toward the observer; and in FIG. 12, the strobe light projects out of the plane of FIG. 12, away from the observer.

While this invention applies specifically to underwater photography, many other applications can be projected, such as tool and measuring devices that use flexible arms, as well as applications in the tool industry and in the classroom and home, for positioning reading lights, etc.

I claim:

1. In an adjustable, articulated, underwater strobe arm assembly, the combination comprising:
   (a) at least three links arranged in end-to-end relation, for adjustably interconnecting items of photographic equipment,
   (b) at least one link including longitudinally endwise spaced pairs of sockets to receive and adjustably tighten on balls carried by other links,
   (c) said one link including two elongated link sections, each of which carries two of the sockets,
   (d) hinge means associated with and interconnecting the sections, to allow relative rotating of the sections about a first axis extending longitudinally,
   (e) and clamping means carried by said one link to effect relative rotation of the sections about said longitudinal axis, in response to tightening of the clamping means, whereby the sockets tighten onto the balls to prevent relative rotation.

2. The combination of claim 1 wherein said first axis is offset from a second longitudinal axis extending through the centers of said balls.

3. The combination of claim 2 wherein said clamp means includes a tie member extending between said sections, and offset from said first and second axes.

4. The combination of claim 3 wherein said clamp means is located about midway between opposite end of said sections.

5. The combination of claim 1 including a camera carried by said arm assembly, and a light unit carried by said arm assembly so that the light unit swivels relative to the camera when the clamp assembly is loosened to loosen the sockets relative to the balls.

6. The combination of claim 1 including a light unit assembly including a primary support member, and a secondary support member on one of said links, in spaced relation to said one link, and an adjustable, swivel connection between said primary and secondary members, allowing relative swiveling thereof.

7. The combination of claim 5 wherein said swivel connection includes elements having interfitting conical surfaces that can relatively rotate, and which are tightenable into frictional interengagement.

8. The combination of claim 1 wherein said hinge means includes two longitudinally spaced connectors interconnecting said sections.

9. The combination of claim 1 wherein said connectors are offset from an axis extending through the center of the balls.

10. The combination of claim 1 wherein said hinge means includes two interengaged abutments carried by the sections in offset relation to an axis through the centers of the balls.

* * * * *